United States Patent [19]

Klaus

[11] 3,876,088
[45] Apr. 8, 1975

[54] LOADING AND UNLOADING APPARATUS FOR GOODS VEHICLES

[76] Inventor: Kaspar Klaus, 46, Schlachthofstrasse, 894 Memmingen, Germany

[22] Filed: July 28, 1972

[21] Appl. No.: 276,157

[30] Foreign Application Priority Data
Aug. 3, 1971 Germany................................ 2138674

[52] U.S. Cl................................. 214/77 R; 212/8 R
[51] Int. Cl................................................. B60p 1/48
[58] Field of Search........ 214/77 R, 78, 80; 212/8 R

[56] References Cited
UNITED STATES PATENTS

| 3,468,439 | 9/1969 | Olitsky et al. | 214/77 R |
| 3,515,295 | 6/1970 | Klaus | 214/77 R |
| 3,523,620 | 8/1970 | Klaus | 214/77 R |

FOREIGN PATENTS OR APPLICATIONS

| 1,630,543 | 5/1970 | Germany | 214/77 R |
| 1,456,509 | 1/1969 | Germany | 214/77 R |

Primary Examiner—Albert J. Makay
Assistant Examiner—Leslie J. Paperner
Attorney, Agent, or Firm—Holman & Stern

[57] ABSTRACT

Apparatus for loading and unloading e.g. containers on to and from a goods vehicle in which there is provided a transverse bridge-form lifting part in front of and behind the load-carrying surface of vehicle. Each lifting part carries lifting equipment and can be hinged selectively to one side of the vehicle or to the other side. A piston cylinder unit lifts each bridge-form part so that it swings about the selected hinge and adopts an outwardly-inclined position at the relevant side of the vehicle. The apparatus can operate at either side of the vehicle by selecting the appropriate hinge.

8 Claims, 7 Drawing Figures

LOADING AND UNLOADING APPARATUS FOR GOODS VEHICLES

BACKGROUND OF THE INVENTION

The invention relates to goods vehicles having apparatus for loading and unloading containers or other large loads, having a loading element in front of the load and another behind the load for taking up or setting down the load at the side of the vehicle.

PRIOR ART

Loading apparatus of this kind are already known. The loading elements of these prior forms of loading apparatus comprise, for example, a column, a mast or the like, supported by a piston cylinder arrangement on the vehicle chassis, whereby the mast or the like is pivotable in a plane at right angles to the longitudinal axis of the vehicle. The load may hang directly or indirectly from the upper end of the mast. It is possible to load and unload the load to and from the vehicle with this arrangement.

Loading apparatus of this kind have the disadvantage that they can frequently operate at one side of the vehicle only. It is, however, desirable that the loading apparatus should be operable in the same way on both sides of the vehicle so that it is possible to on-load a container at the one side of the vehicle and also lift it over the vehicle and off-load it at the other side.

The known loading apparatus which can be used at both sides of the vehicle often have the disadvantage that comparatively expensive drives must be used to enable the apparatus to operate at both sides of the vehicle. Moreover, such apparatus often have the additional disadvantage that while the loading apparatus can operate at both sides of the vehicle maneuvrability of the load at one side is severely limited.

OBJECT AND SUMMARY OF THE INVENTION

An object of the invention is to provide a loading apparatus for the purpose specified which can be used in substantially the same manner at both sides of the vehicle.

The loading apparatus provided by the invention comprises a loading element in front of and a loading element behind the load in which each loading element has a bridge-form part which extends transversely or substantially transversely across the vehicle and which has, at its ends in the region of each side of the vehicle, a pivot hinge, the axis of which extends in the direction of intended motion of the vehicle, with the bridge-form part carrying lifting equipment and means to pivot said part about one or other pivot hinge.

In the invention, the lifting equipment and bridge-form part form a unit which can be selectively employed at one side of the vehicle or at the other side of the vehicle. Advantageously, the pivot on the bridge-form part is adjacent the load so that maneuvrability is improved.

In addition to a simple construction, the invention allows good supervision of operation and has more especially the advantage that the component which improves the operability of the loading element at the appropriate side of the vehicle, namely the bridge-form part, at the same time assists the lifting action so that drive means to pivot the bridge-form part about one or other of said pivots is part of the lifting means.

Preferably, a lifting column is arranged on the bridge-form part. The lifting column can take various forms. For example, it can be rigidly connected with the bridge-form part although it is possible for the lifting column to be pivotable on the bridge-form part about an axis extending in the direction of intended vehicle motion. Along with such a simple construction of loading element, adaptability of the lifting point for the load on the loading element is achieved for each load position.

The maneuvrability is improved if the lifting column is telescopically extensible or if a lifting arm is pivotally mounted on the lifting column. Obviously, both means can be used together and a pivotable lifting arm can be arranged on a telescopically extensible lifting column.

Advantageously, the bridge-form part is supported on an intermediate frame which also carries the opposing parts of the pivot hinges, with the intermediate frame itself being carried by the vehicle chassis. Where support legs are used, as is usually necessary in view of the size of the loads to be handled, the support legs can also be mounted on the intermediate frame.

It is of advantage if the intermediate frame can be used to displace one of the loading elements with respect of the vehicle chassis in the longitudinal direction of the vehicle, so that the spacing of the two loading elements can be adapted to the length of the load.

The pivot hinges for the bridge-form part can be arranged at the loading surface of the vehicle above the support positions of the load. It has been found that very favorable results can be achieved if the pivot hinges are arrranged substantially above the loading surface as then substantial parts of the loading elements are also lifted during the pivoting operation. The available lifting height is thereby improved.

To facilitate understanding of the invention and to enable it to be readily carried into practice, reference will now be made to the accompanying drawings which illustrate various embodiments of the invention, by way of example, and in which:

DETAILED DESCRIPTION OF THE EMBODIMENTS

Figure 1:
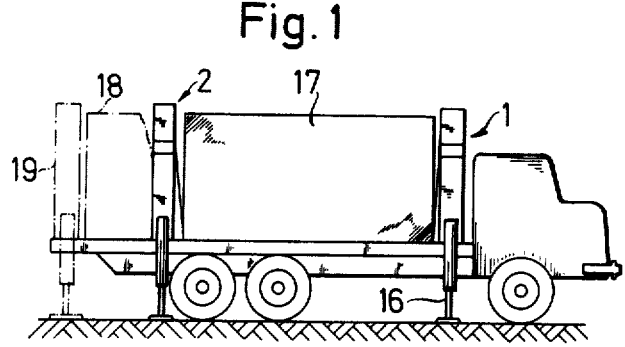
FIG. 1 is a side view of a goods vehicle having a loading apparatus according to the invention.

Referring first to FIG. 1, there is shown a goods vehicle having two loading elements 1 and 2, with loading element being arranged in front of a load 17 and the other behind the load. The loading element 2 can, for example, be displaced along the vehicle chassis into the position denoted by chain dotted lines 19 when a longer load is to be loaded or transported. This displacement is catered for by the fact that a bridge-form part 3 is arranged on an intermediate frame 15. The intermediate frame is displaceable with respect to the vehicle chassis and also carries support feet 16 which can be extended or swung out during the loading operation.

In this embodiment, the intermediate frame 15 is substantially of U shape and each bridge-form part is pivoted at each end to the upper end of the relevant vertical limb of the "U", with the pivots being denoted 4' and 5'. Thus, the bridge-form part 3 extends between the pivots and carries a telescopically-constructed lifting column 12, which lifting column is rigidly connected to the bridge-form part 3. The extensible telescopic part of the column is denoted by reference 20. The drive means for extending part 20 are not shown.

A piston cylinder arrangement 6 is supported with one end on the intermediate frame 15 and with the other end on the bridge-form part 3. It will be appreciated that, when the piston cylinder arrangement is actuated, the bridge-form part will perform a swinging movement about pivot 4' or about the other pivot 5' so that the lifting column will adopt a more-or-less suitably inclined position to one or other side, or even a horizontal position.

It will be appreciated that appropriate regulating means (for example removable insert bolts) will be employed to determine about which pivot the swinging motion takes place.

Figure 2:
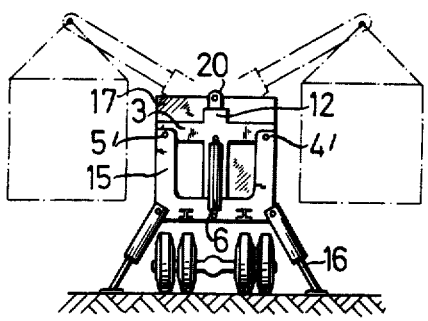
FIG. 2 is a rear view of the vehicle of FIG. 1, and FIGS. 3 to 7 are views similar to FIG. 2 showing different embodiments of the invention.

The chain dotted lines in FIG. 2 denote two possible positions for the lifting column 12 from which the load 17 can be moved outwardly of the vehicle by means of the loading elements.

Figure 3:
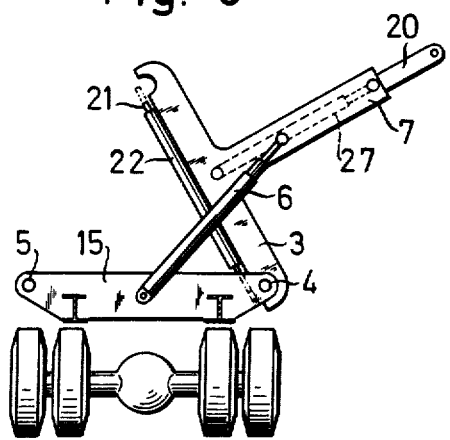

The arrangement of FIG. 3 shows a bridge-form part 3 having a lifting column 7 which is rigidly connected to the bridge-form part. The pivots 4 and 5 are, however, in this embodiment arranged at a comparatively low level. The lifting column 7 also has a telescopic part 20.

Moreover, FIG. 3 shows a still further regulating mechanism for controlling which pivot 4 or 5 is used. A regulating bolt 21 which extends parallel to the bridge-form part 3 in a guide 22 can be displaced into one or other extreme position in which one or other of the hinges is closed while the other remains open. In the central position, which can, for example, be the starting position, both hinges are closed.

Figure 4:
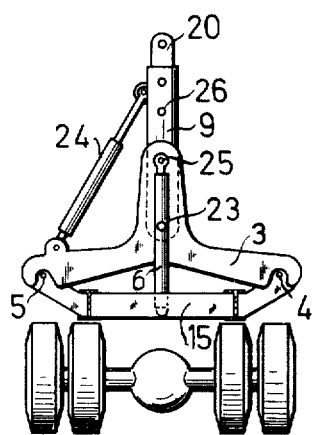

In the embodiment according to FIG. 4, which is shown in the starting position, lifting column 9 is pivotable about a hinge 23 by means of a piston cylinder arrangement 24. The drive or piston cylinder arrangement 6 for the bridge-form part 3 engages the bridge-form part at a comparatively high position 25 so that this drive has a comparatively large operational length.

The piston cylinder arrangement 24 is indicated in a central position in FIG. 4. The lifting column 9 can thus be pivoted to one or other side, which pivotal movement is superimposed on the movement about one of the pivots 4 or 5. The lifting column 9 can be extended by part 20 as described above and in the extended position, an insert bolt can be introduced into bore 26. It is, however, also possible, as in the embodiment of FIGS. 2 or 3, to provide a piston cylinder arrangement in the telescopic lifting column as denoted by chain dotted lines 27 in FIG. 3.

Figure 5:
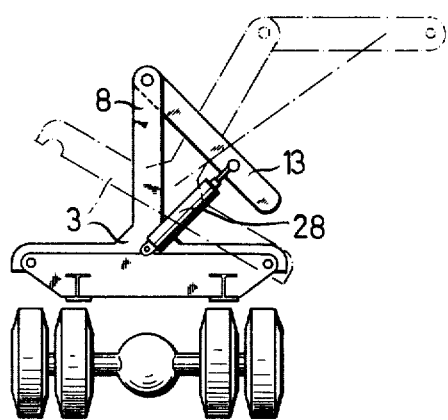

In the embodiment according to FIG. 5 a lifting column 8 is rigidly connected with the bridge-form part 3. The lifting column 8 carries a lifting arm 13 and a piston cylinder arrangement 28 is provided to drive the arm 13. The piston cylinder arrangement 28 has a comparatively large stroke, for example by using telescopic cylinders. This provides the possibility of bringing the lifting arm 13 into an extended position with respect to the lifting column 8 so as to, in this way, swing the arm 13 with or without a load from one side of the vehicle to the other side.

Figure 6:
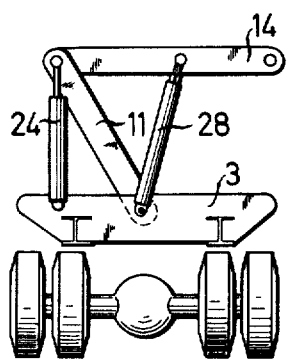

In the embodiment according to FIG. 6, the drive for arm 14 can also be by means of a telescopic piston cylinder arrangement 28 so that the arm can be moved over the extended position. A lifting column 11 is, however, pivotable with respect to the bridge-form part 3 and driven by the piston cylinder arrangement 24.

Figure 7:
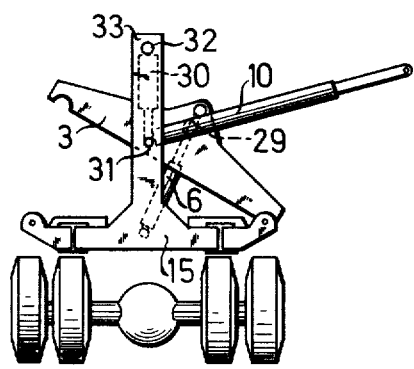

Finally, in the embodiment according to FIG. 7, a lifting column 10 is in the form of a double acting arm which can be swung about a link 29 of the bridge-form part 3 and the drive for which is in the form of a piston cylinder arrangement 30 which extends between an end point 31 of the lifting column 10 and a point 32 at the upper end of an extension 33 on the intermediate frame. In the transportation position, the lifting column 10 extends substantially vertically due to a fully extended piston cylinder arrangement 30.

With regard to the embodiments in accordance with FIGS. 3 to 7, it should be noted that they are, of course, also provided with support legs which are not illustrated in the drawings. If necessary, the intermediate frame can, in each case, be longitudinally movable on the vehicle.

I claim:

1. Apparatus for loading and unloading loads on to and from a load carrying surface of a goods vehicle having a chassis, comprising a first loading element in front of said load carrying surface, and a second loading element behind said load carrying surface, wherein the improvement resides in that each loading element comprises an intermediate frame having a base carried on said chassis and a pair of support members each upwardly extending from the respective ends of said base; a bridge-form part extending transversely over the entire width of the vehicle and between the upwardly extending support members; lifting means carried by said bridge-form part; a pivot means at each end of said bridge-form part and the respective upper ends of said pair of upwardly extending support members, said pivot means having an axis extending longitudinally of the vehicle; and means for pivoting said bridge-form part selectively about one or the other of said pivot means, said means for pivoting said bridge-form part comprising a single piston-cylinder arrangement, said piston-cylinder arrangement being disposed in the symmetrical plane of the vehicle and connected between said base of said intermediate frame and said bridge-form part so that it is capable of moving said bridge-form part to either side of the vehicle.

2. The apparatus according to claim 1, wherein said lifting means comprise a lifting column arranged on the bridge-form part.

3. The apparatus according to claim 2, wherein the lifting column is arranged symmetrically with respect to the bridge-form part.

4. The apparatus according to claim 2, wherein the lifting column is rigidly connected with the bridge-form part.

5. The apparatus according to claim 2, wherein the lifting column is telescopically extensible.

6. The apparatus according to claim 1, wherein one of the loading elements is displaceable longitudinally of the vehicle chassis, and by virtue of the fact that it is mounted on said intermediate frame, and wherein support legs are pivotally mounted on the intermediate frame.

7. The apparatus according to claim 1, wherein the pivot means is arranged higher than the loading surface of the vehicle.

8. The apparatus according to claim 1, wherein the pivot means are arranged substantially over the loading surface.

* * * * *